Patented Feb. 9, 1926.

1,571,932

UNITED STATES PATENT OFFICE.

ROBERT L. CORBY, OF CHEVY CHASE, MARYLAND, AND RUTH GLASGOW, OF PITTSBURGH, PENNSYLVANIA, ASSIGNORS, BY MESNE ASSIGNMENTS, TO THE FLEISCHMANN COMPANY, A CORPORATION OF OHIO.

PROCESS OF PREPARING YEAST-NUTRIENT SOLUTIONS AND OF MANUFACTURING YEAST THEREFROM.

No Drawing.   Application filed March 13, 1919.   Serial No. 282,505.

*To all whom it may concern:*

Be it known that we, ROBERT L. CORBY and RUTH GLASGOW, citizens of the United States, residing, respectively, at Chevy Chase, in the county of Montgomery and State of Maryland, and Pittsburgh, in the county of Allegheny and State of Pennsylvania, have invented certain new and useful Improvements in a Process of Preparing Yeast-Nutrient Solutions and of Manufacturing Yeast Therefrom, of which the following is a specification.

This invention relates to a process of preparing a yeast-nutrient solution containing essentially sacchariferous material and yeast-nutrients, including cereal material and compounds containing yeast-assimilable in organic nitrogen, and to a process of propagating yeast, and particularly bakers' yeast therein, in a manner which may be easily and efficiently carried out.

It is accordingly an object of this invention to prepare a yeast-nutrient solution of the above mentioned type and to propagate yeast therein in a manner such as materially to increase the yield and strength of the yeast when compared with that hitherto obtained by known processes, whereby substantial economies are obtained.

Heretofore yeast has been propagated in a cereal nutrient material containing the soluble constituents derived from the saccharification of a cereal mash (such as a mash prepared from barley, rye and corn).

As illustrative of the manufacture of yeast from cereal products, 2000 pounds of yeast might, for example, be prepared from nutrient materials obtained by the saccharification of approximately 7000 pounds of cereals, such products being diluted, for example with about 6700 gallons of water.

Our present invention is based upon the discovery that a highly efficient nutrient solution for commercial propagation and growth of bakers' yeast is produced by the use of molasses or equivalent sacchariferous solution as a substitute for a considerable proportion of the saccharified cereal mash constituents heretofore generally used in yeast manufacture.

We have discovered that a relatively large quantity of molasses such as is obtained on the market at a relatively low cost, but containing a relatively large proportion of invert sugar, as dextrose and levulose, as well as a small percentage of cane sugar, can be used with great reduction in the initial expense; and that if, there be also added sufficient ammonia, or ammonium salts of proper character, a yeast nutritive is produced, which, all other things equal, will induce the propagating and multiplying of a relatively greater quantity of yeast of good quality.

We have reduced the total quantity of the expensive cereal components to a relatively small proportion (varying according to circumstances from fifty percent down to ten percent) of the quantity heretofore employed. A considerable economy in the process (based on normal prices) is thus effected.

After the mash mass (now containing only the largely reduced quantity of saccharifiable cereal materials) has, with proper quantity of water, been introduced into suitable receptacles it is subjected to heat, and to the other conditions required for saccharifying the starch components in this relatively reduced body of cereals. During this stage of treatment the ingredients of the entire body become thoroughly mixed, and the solids, the cereal matter, the newly saccharified ingredients, the protein materials, soluble and insoluble, the mineral salts and the added saccharine materials are uniformly distributed.

After the mass above described has been saccharified, as set forth, it is (while in the orginal containers or in others adapted to receive it) subjected to an acidifying treatment. We prefer to form the acid at the time of the treatment by culturing lactic bacteria in the mass, but do not mean to limit all the features of our improved material and process to such method of acidifying. By utilizing the activities of bacteria of this class we not only can delicately control the extent to which the acidifying proceeds, but have found that the precedent action of organisms of this class is an important factor in modifying the protein components and the mineral salts to provide the maximum nourishment for the yeast at a later stage.

After the mass has been acidified to the proper extent, a body of non-cereal material containing yeast-assimilable inorganic nitrogen is introduced. There are several of these materials which can be used within the scope of our invention. But for several reasons we prefer ammonia in solution in water. It is added in such proportion as to neutralize a part of the lactic acid with the formation of ammonium lactate, an appreciable proportion of the acid being left free, however, because of its benefit, when present, to the yeast. Under many circumstances we prefer the ammonium lactate, one reason being that when the lactate acid is released (upon the breaking down of the salt by the activities of the yeast), it is less violent and toxic to the yeast than are the other acids we have used, either combined in ammonium salts, or otherwise, the latter generally requiring the presence of antacid mineral salts or other antacid substances to act as re-agents in neutralizing the detrimental excess of released acid. That part of the acid which is not neutralized, as above described may be allowed to remain in the yeast nutrient mass until the latter is placed in the vessel wherein yeast is to be propagated in the nutrient. However, prior to the initiation of the yeast propagation in the nutrient, the acidity of the nutrient is preferably reduced to such an amount that 0.3 cubic centimeter normal alkali solution will neutralize the acid present in a 20 cubic centimeter sample of the nutrient solution, it having been found that such a slight acidity is most advantageous for yeast propagation.

The yeast obtains the nitrogen necessary for cell structure from the ammonium lactate, (formed as above described at earlier stages) more readily than it obtains it from the nitrogenous materials which are derived from cereals when the latter are exclusively used in large masses as the initial substances. We retain, however, as above described, a relatively small proportion of the cereal substances and saccharify them as above described because the carbohydrates and protein substances derived therefrom tend to make the yeast more stable and give it longer vitality than is the case when it is nourished in a nutrient composition or solution which does not have these cereal derivatives as parts of its contents.

The ammonium salt is provided in such proportions relative to the cereals, as to replace the missing yeast-assimilable nitrogen, so that a resultant mass is obtained which has substantially the same relative amounts of yeast-assimilable nitrogen and sugars that such mass would contain if prepared entirely from cereal materials in the manner above described.

The ammonia cannot be supplied in material quantities to the best advantage directly to the region where the yeast is expected to propagate and multiply, as the latter will not thrive to the utmost in a medium where the ammonia exists in a free state. It is preferably supplied as the component of an innocuous salt, or equivalent, if added in large amounts where it will be directly associated with the yeast.

Much of the same result can be obtained if the proper supplementary yeast-assimilable nitrogen be provided by introducing, at the proper stage, ammonium lactate produced outside of the yeast-nutrient saccha- riferous mass; but it is better to form in the mass the proper amount of organic acid (preferably lactic acid) by a bio-chemical process; and, then, neutralize such acid by the addition of ammonia.

We may mention as a typical mass such as above described one containing, (for the usual fermenter) from twelve to fourteen thousand gallons of water, five to six thousand pounds of molasses, one hundred and fifty pounds of ammonium sulphate, twenty pounds of calcium phosphate, thirty pounds of sodium phosphate, thirty pounds of potassium phosphate. If a percentage of the products of an ordinary grain mash process are to be utilized ten percent of a mash mass can be employed, that is of a mass having four thousand or thereabouts pounds of corn, together with the proportioned amounts of barley malt, rye and sprouts.

The principal ingredients are the saccharine material and the ammonium salt. And such variations will be necessary as will insure that there shall be present the proper amount of nitrogen in relation to the sugar body to develop a definite amount of yeast.

We have obtained an increase of twenty-five percent in the yield of yeast from a yeast-nutrient composition or solution such as above described, containing a saccharine mass comprising invert sugar (dextrose, levulose or the like, in the form of molasses, for example), other things being equal, and by introducing supplemental non-cereal material containing yeast-assimilable inorganic nitrogen either by adding them in the form of an ammonium salt, or, preferably, by forming an ammonium salt in the mass in the way above described.

We have above described the procedure; the sequence of steps, the materials, the proportions, etc., which we at present prefer; but it will be understood that there can be variations in all of these respects without departing from the scope of the invention. Thus the supplemental non-cereal material containing yeast-assimilable inorganic nitrogen can be introduced into the vessel used in preparing the nutrient composition before the introduction of the sacchariferous mass. The native cereals can be reduced even below ten percent; in fact, can, when other proper substitutes are used, be omitted, provided the proper proportions of sacchariferous materials and yeast-assimilable nitrogen be employed. The acidifying can be accomplished at a stage differing, in sequence, in relation to the other steps described.

One of the advantages incident to the addition of measured predetermined quantities of the nitrogen bearing material is that we can accurately maintain the necessary ratio between the yeast-assimilable nitrogen and the carbohydrate components. There are wide variations in the percentage content of yeast-assimilable nitrogen in different masses of cereals (such as used in yeast manufacture). These variations result, some from differences in seasons which affect the growth of the cereals, some from variations in exposure conditions after harvesting, for example variations in temperatures, or atmospheric humidity.

When following the older process above described, in the manufacture of yeast there were wide variations in the yields, caused by these varying precedent conditions affecting the cereals in the successively used masses.

But we are now able accurately to ascertain the amount of yeast-assimilable nitrogen in each of the successive masses of nutritive media, and can therefore accurately determine the variable quantity of non-cereal material containing yeast-assimilable nitrogen necessary, in each instance, for a desired high yeast yield, and can supply the requisite supplemental nitrogen by accurately measuring the ammonium salt or equivalent.

As will be obvious from the preceding description, a yeast-nutrient prepared according to the method of our present invention contains such a quantity of substances supplying yeast-assimilable nitrogen as will induce a growth of yeast by a clear wort commercial yeast process, such as to consume substantially all of the sugars present in the solution. As a consequence there is left, after the yeast growth is carried to the customary completion, a substantially desugared residual aqueous solution from which the yeast may be separated in a usual manner.

Having described our invention, what we claim as new and desire to secure by Letters Patent, is:

1. In the art of manufacturing yeast the steps which comprise preparing a yeast-nutrient solution consisting essentially of molasses, cereal material and yeast nourishing salts, producing an acid condition in the solution to a degree somewhat in excess of that preferable for yeast propagation, and introducing a compound containing yeast-assimilable inorganic nitrogen and having an alkaline reaction, in such amounts that both the degree of acidity is lowered and the amount of assimilable nitrogen is raised to that preferable for yeast propagation.

2. In the art of manufacturing yeast the steps which comprise preparing a yeast-nutrient solution consisting essentially of molasses, cereal material and yeast nourishing salts, producing an acid condition in the solution to a degree somewhat in excess of that preferable for yeast propagation, and introducing a compound containing yeast-assimilable inorganic nitrogen and having an alkaline reaction, in such amounts that both the degree of acidity is lowered to that preferable for yeast propagation, and sufficient yeast-assimilable nitrogen is added, so that the total yeast-assimilable nitrogen is present to such an amount that the ratio thereof to the fermentable sugars is such that substantially a total utilization of the sugar materials by the yeast will occur when yeast is grown in such mixture.

3. In the art of manufacturing yeast the steps which comprise preparing a yeast-nutrient solution consisting essentially of molasses, cereal material and yeast nourishing salts, propagating lactic acid bacteria in the solution until the solution is acid to a degree in excess of that preferable for yeast propagation, and introducing a compound containing yeast-assimilable inorganic nitrogen and having an alkaline reaction, in such amounts that the degree of acidity is lowered to that preferable for yeast propagation, and sufficient yeast-assimilable nitrogen is added so that the total yeast-assimilable nitrogen is present to such an amount that the ratio thereof to the fermentable sugars is such that substantially a total utilization of the sugar materials by the yeast will occur when yeast is grown in such mixture.

4. The process of manufacturing yeast which comprises preparing a yeast-nutrient solution comprising essentially molasses, cereal material and yeast nourishing salts, acidifying the solution by lactic fermentation, introducing a substance containing yeast-assimilable nitrogen and having alkaline reaction, in such amounts that the acidity is reduced to that preferable for yeast propagation, and propagating yeast therein, the sacchariferous material, cereal material, yeast-nutrient salts and yeast-assimilable nitrogen being present in such amounts and in such ratios that the resultant solution has substantially the same composition as a usual yeast-nutrient solution prepared entirely from cereal materials.

In testimony whereof, we affix our signatures.

ROBERT L. CORBY.
RUTH GLASGOW.